Patented Oct. 3, 1950

2,524,228

UNITED STATES PATENT OFFICE 2,524,228

METHOD OF PREPARING A REACTION PRODUCT OF EPSILON-CAPROLACTAM AND METHYL ALCOHOL

Edward L. Kropa, Old Greenwich, and John J. Padbury, Stamford, Conn., assignors to American Cyanamid Company, New York, N. Y., a corporation of Maine No Drawing. Application April 19, 1948, Serial No. 21,855

2 Claims. (Cl. 260—78)

This invention relates broadly to the production of new and useful synthetic compositions. More particularly the invention is concerned with the preparation of reaction products of epsilon-caprolactam and a monohydroxy compound. The claimed invention is directed specifically to a method of preparing linear polymeric materials which are reaction products of (1) epsilon-caprolactam and (2) methyl alcohol, but similar methods also can be used in preparing linear polymeric materials which are reaction products of (1) epsilon-caprolactam and (2) monohydroxy compounds other than methyl alcohol and which can be represented by the general formulas R—OH and R'—(OR'')$_n$—OH where R represents a member of the class consisting of hydrogen, aliphatic hydrocarbon radicals and aromatic-substituted aliphatic hydrocarbon radicals, R' represents a hydrocarbon radical, R'' represents a member of the class consisting of divalent aliphatic hydrocarbon radicals and divalent aromatic-substituted aliphatic hydrocarbon radicals, and $n$ represents any positive integer, e. g., 1, 2, 3, 4, 5, 10, 20, 50, 100 or any higher number, the limit on the value of $n$ being governed only by the type of product wanted and the availability of the alcohol-ethers represented by the formula. The ingredients of (1) and (2) are employed in the ratio of 1 mole (about 1 mole) of the former to not less than 1 mole (not less than about 1 mole) of the latter. Thus, the ingredients of (1) and (2) may be used in the ratio of 1 mole of epsilon-caprolactam to from 1 to 20 moles (about 1 mole to about 20 moles) of a compound or mixture of compounds (2, 3, 5, 10, 100 or an infinite number) embraced by each of the aforementioned formulas R—OH and R'—(OR'')$_n$—OH, or a mixture comprising one or more (2, 3, 5, 10, 100 or an infinite number) of the compounds represented by the formula R—OH and one or more (2, 3, 5, 10, 100 or an infinite number) of the compounds embraced by the formula R'—(OR'')$_n$—OH. The linear polymeric materials prepared in accordance with our invention are preferably those which are composed substantially completely of the above reaction products and which have an average molecular weight of not more than 2000 when the molecular weight of the monohydroxy reactant is less than 100 and correspondingly higher as the molecular weight of the monohydroxy compound employed exceeds 100. More particularly, we prefer to prepare linear polymeric materials which contain an average ranging from a little above 2 (e. g., 2.5), generally at least 3 or 4 (at least about 3 or 4), to 16 (about 16) caprolactam units per molecule.

Illustrative examples of radicals which R in the formula

I    R—OH may represent are: monovalent aliphatic hydrocarbon radicals, e. g., methyl, ethyl, propyl, isopropyl, n-butyl, isobutyl, sec.-butyl, tert.-butyl, n-amyl, isoamyl, tert.-amyl, hexyl, heptyl, octyl, nonyl, decyl to octadecyl, inclusive, allyl, methallyl, ethallyl, crotyl, butenyl, isobutenyl, 2-butenyl, butynyl, oleyl, linalyl, etc., including cycloaliphatic, e. g., cyclopentyl, cyclopentenyl, cyclohexyl, cyclohexenyl, cycloheptyl, etc.; and monovalent aromatic-substituted aliphatic hydrocarbon radicals, e. g., benzyl, cinnamyl, phenylethyl, phenylpropyl, phenylallyl and other aryl-substituted aliphatic hydrocarbon radicals corresponding to the examples of the unsubstituted monovalent aliphatic hydrocarbon radicals just mentioned.

Illustrative examples of radicals which R' in the formula

II    R'—(OR'')$_n$—OH may represent are: monovalent aliphatic hydrocarbon radicals and monovalent aromatic-substituted aliphatic hydrocarbon radicals, numerous examples of which have been given above with reference to R in Formula I; monovalent aromatic hydrocarbon radicals, e. g., phenyl, diphenyl or xenyl, naphthyl, etc.; and monovalent aliphatic-substituted aromatic hydrocarbon radicals, e. g., tolyl, xylyl, ethylphenyl, propylphenyl, isopropylphenyl, allylphenyl, etc. In brief, R' represents any hydrocarbon radical.

Illustrative examples of divalent radicals which R'' in Formula II may represent are divalent aliphatic hydrocarbon radicals and divalent aromatic-substituted aliphatic hydrocarbon radicals corresponding to the examples of monovalent radicals mentioned above as illustrative of examples of radicals that R in Formula I may represent. Thus, R'' may represent divalent radicals such, for instance, as divalent aliphatic hydrocarbon radicals, e. g., ethylene, propylene (trimethylene), propenylene, butylene, isobutylene, pentylene, isopentylene, butenylene, hexylene, heptylene, octylene, nonylene, decylene to octadecylene, inclusive, etc., including divalent cycloaliphatic hydrocarbon radicals, e. g., cyclopentylene, cyclohexylene, cyclohexenylene, cycloheptylene, etc.; and divalent aromatic-substituted aliphatic hydrocarbon radicals, e. g., phenylethylene, phenylpropylene, naphthylisobutylene, xylylene, etc.

The hydroxy group in the compounds represented by Formulas I and II may be attached to a primary, secondary or tertiary carbon atom.

It was suggested prior to our invention that epsilon-caprolactam be polymerized alone or in the presence of a small amount of a polymerization catalyst at a temperature above 180° C., more particularly at a temperature within the range of 180° C. to 250° C., until a polymerization product was obtained which could be continuously spun from a melt into uniform threads. When a polymerization catalyst was employed, it was used in an amount corresponding to not more than 1/50 equivalent calculated on the monomeric lactam, specifically from 1/100 to 1/200 equivalent based on the starting lactam. Water, lithium chloride, zinc chloride, benzyl alcohol, dodecyl alcohol, benzylamine, octadecylamine, guanidine carbonate, toluenesulfonic acid, potassium carbazole, benzyl chloride and phenol esters of carboxylic acids were among the polymerization catalysts suggested for this purpose. Such polymerization products are hard, hornlike materials with average molecular weights such that the products can be drawn into fibers, that is to say, with average molecular weights substantially above 10,000, e. g., 15,000 or 20,000 or even as high as 30,000 or more.

When epsilon-caprolactam is polymerized as above-described with the aid of a small amount of a polymerization catalyst, the polymerization can lead only to the production of high-molecular weight polymers since there is not a sufficient amount of catalyst in the reaction mass to favor the formation of low-molecular-weight polymers. The following simple explanation is given in order to illustrate the principles involved in such a catalytic polymerization reaction:

If it be assumed that the polymerization of 100 molecules of monomeric epsilon-caprolactam is to be effected in the presence of 1 molecule of water as a polymerization catalyst, a giant polymer molecule having a molecular weight 100 times that of the monomeric epsilon-caprolactam theoretically would result; if two molecules of water were present, then each would react with 50 molecules of the monomer and a polymer having a molecular weight 50 times that of the monomeric epsilon-caprolactam theoretically would result. From this it will be seen that, generally speaking, in such catalytic polymerization reactions, the size of the polymer molecule is dependent, other factors being the same, upon the amount of polymerization catalyst which is present.

The present invention is based on our discovery that when epsilon-caprolactam and methyl alcohol or other compounds of the kind embraced by Formula I or by Formula II, or a mixture of such compounds, are heated together at a temperature of at least 140° C. (about 140° C.) but below the temperature of decomposition of the polymeric reaction product which forms, using molar ratios such as have been mentioned in the first paragraph of this specification, products are obtained which are different in kind (as evidenced by their differences in properties) from those obtained when epsilon-caprolactam is polymerized in the presence of the same compound or compounds in catalytic amounts, that is to say, in amounts not exceeding 1/50 equivalent, specifically from 1/100 to 1/200 equivalent, based on the monomeric epsilon-caprolactam being polymerized. Instead of obtaining a simple (unpolymerized) reaction product as the main or only product of the reaction, as might be expected, a polymeric material in all cases is obtained; and instead of this polymer being a fiber-forming (capable of being drawn into fibers), high-molecular-weight (about 10,000 molecular weight) material, as further might be expected from the published information on the polymerization of epsilon-caprolactam, the polymerization reaction was surprisingly found to be an equilibrium reaction which never goes to completion and which yields only polymeric materials having non-fiber-forming characteristics, more particularly a mixture of linear polymers usually having an average molecular weight of not more than 2000 (in some cases the average molecular weight may be a little higher, e. g., up to 2500 or thereabouts) when the molecular weight of the monohydroxy reactant is less than 100 and correspondingly higher as the molecular weight of the monohydroxy compound employed exceeds 100. Thus, exclusive of the chemically combined water or alcohol or alcohol-ether in the polymeric reaction product, the polymeric compositions (mixtures of linear polymers) produced in accordance with our invention usually have an average molecular weight within the range of 250 (about 250) or 300 (about 300) to 1000 (about 1000) or 1500 (about 1500) or 2000 (about 2000), but in some cases may be as much as 2400 or 2500 (about 2400 or 2500) or a little higher.

By effecting reaction between epsilon-caprolactam and water or an alcohol of the kind embraced by Formula I or an alcohol-ether of the kind within the scope of Formula II, or mixtures thereof, using for each mole of the epsilon-caprolactam at least 1 mole of the co-reactant, a relatively large proportion of the total number of molecules of caprolactam enters into the primary reaction product. Many polymer chains apparently are started, with the result that all of the caprolactam that will react enters into the reaction before any individual polymer chain attains a great length.

Taking water as illustrative of the compound used as a co-reactant with epsilon-caprolactam, ordinarily it would be expected, as indicated hereinbefore, that when equivalent amounts (or with the water in molecular excess) of these materials were caused to react together, the product would be monomeric epsilon-aminocaproic acid, $$NH_2(CH_2)_5COOH$$

Surprisingly, however, the product is essentially polymeric in nature, although a small amount of the simple compound may be formed along with the polymeric products. Unreacted caprolactam is always found in the reaction mass, even when large excesses of water, alcohol or alcohol-ether are used. It is probable that at the beginning of the reaction the water (or alcohol or alcohol-ether) and the epsilon-caprolactam react in stoichiometrical proportions, after which polymers of low molecular weight are produced.

When the co-reactant is water or a monohydric alcohol of the kind embraced by Formula I, the polymeric reaction products of our invention, as ordinarily produced, may be represented by the following general formula:

III $$NH_2(CH_2)_5CO[NH(CH_2)_5CO]_xNH(CH_2)_5COOR$$

When the co-reactant is an alcohol-ether of the kind within the scope of Formula II, the polymeric reaction products of our invention, as ordinarily produced, may be represented by the following general formula:

IV

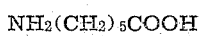
$$NH_2(CH_2)_5CO[NH(CH_2)_5CO]_x$$
$$NH(CH_2)_5COO(R''O)_n-R'$$

In Formulas III and IV $x$ represents a number from 1 to 18, inclusive, that is to say, $x$ has an average value between 1 and 18, and R (Formula III), R', R'' and $n$ (Formula IV) have the same meanings as given in the first paragraph of this specification with reference to the formulas R—OH and R'—(OR")$_n$—OH.

In all cases the initial reaction product comprises a mixture of polymers. The mixture may contain a small amount of the dimer of epsilon-aminocaproic acid or ester, in which case $x$ in Formulas III and IV would be 0. The crude reaction product may be fractionated by the use of water or other solvents or mixtures of solvents to obtain fractions in which the polymers are present within a narrower limit of molecular weights.

The temperature at which the reaction is effected between the epsilon-caprolactam and the water or alcohol or alcohol-ether, or mixtures thereof, may be considerably varied, e. g., from about 140° C. to a temperature below the temperature of decomposition of the polymeric reaction product. Temperatures as high as 300° C. (about 300° C.) or 325° C. (about 325° C.) or even as high as 350° C. (about 350° C.) may be employed, if desired, but ordinarily the temperatures used are within the range of 160° C. (about 160° C.) to 250° C. (about 250° C.) or 275° C. (about 275° C.). The reaction proceeds rather slowly at temperatures of the order of 140° C. to 150° C., and hence temperatures of at least 160° C. (about 160° C.) or 170° C. (about 170° C.) generally are preferred.

In the case of water or the lower-boiling alcohols (e. g., methanol, ethanol, propanol, butanol, etc.) or alcohol-ethers (e. g., ethylene glycol monomethyl ether, ethylene glycol monoethyl ether, etc.), the reaction is effected under autogenous pressure. This pressure may be, for example, from a few pounds per square inch to 5000 or more pounds per square inch depending, for instance, upon the molar ratio of water or low-boiling alcohol or alcohol-ether to the epsilon-caprolactam and the free space in the clave. When the alcohol or alcohol-ether is such that it will not volatilize at the temperature of the reaction, then the reaction can be caused to take place at atmospheric pressure.

In some cases it may be desirable to effect the reaction between the reactants while they are dissolved or dispersed in a liquid solvent or dispersion media which is inert during the reaction. Examples of such liquid materials which may be employed are liquid or liquefiable hydrocarbons, e. g., benzene, toluene, xylene, petroleum ether, the various dialkyl ethers (e. g., dibutyl ether, diamyl ether, etc.), and the like.

The molar ratio of the reactants is important. The epsilon-caprolactam and the water or alcohol or alcohol-ether should be employed in the ratio of 1 mole (about 1 mole) of the former to at least 1 mole (at least about 1 mole) of the latter, for instance in the ratio of 1 mole of epsilon-caprolactam to 1, 2, 3, 4, 5, 10, 15, 20 or even 30 or 40 or more moles of the latter. The maximum amount of the compound (or mixture of compounds) of the kind embraced by Formulas I and II that is used is governed only by practical considerations of economy or efficiency in comparison with the results obtained by using the larger molar proportions.

At the end of the reaction period, which may range, for example, from 1 to 100 or more hours, the unreacted reactants are removed from the reaction mass by any suitable means, e. g., by centrifuging, by evaporation, by distillation, by extraction with a solvent or a mixture of solvents, or by a combination of any or all of such means. Obviously the chosen means will depend to a large extent upon the properties of the material which is caused to react with the epsilon-caprolactam. The unreacted material may be removed in conjunction with the removal of low-molecular-weight polymers, if desired.

Water or any other suitable solvent or mixture of solvents may be employed in purifying the crude reaction product, or in separating the mixture of polymers initially obtained into fractions having different average molecular weights.

The polymerization products of this invention are normally solids which liquefy under heat. Depending upon the particular material which is reacted with the epsilon-caprolactam and the extent, if any, to which the product has been purified or fractionated, they vary from waxy or wax-like solids to finely divided crystalline materials or powders or easily friable solids. Some of the products are soluble in hot water, in alcohol (ethyl alcohol), and in mixtures of alcohol and water, but are insoluble in benzene. In general, their intrinsic viscosities are relatively low, usually being within the range of 0.05 to 0.3 or 0.35. (See Example 19 for a definition of intrinsic viscosity.)

The polymeric materials produced in accordance with our invention have a wide variety of commercial applications. For example, the linear polymeric reaction products of epsilon-caprolactam and water may be used as modifiers of alkyd resins (reaction products of ingredients comprising a polyhydric alcohol and a polycarboxylic acid or anhydride); or the acid grouping thereof may be esterified with a monohydric alcohol or alcohol-ether to yield esters of a polymeric aminocaproic acid, and these esters then may be used as plasticizers for thermosetting or potentially thermosetting resinous materials or molding compositions which normally have insufficient plasticity or flow characteristics. The polymeric epsilon-aminocaproic acid also may be reacted with a polyhydric alcohol (e. g., ethylene glycol, diethylene glycol, triethylene glycol, glycerol, pentaerythritol, etc.) to form a new series of esters. The reaction products of epsilon-caprolactam and a monohydric alcohol or alcohol-ether likewise may be used as a plasticizer for resinous materials and laminating and molding compositions such as those embodying a melamine-formaldehyde, urea-formaldehyde, melamine-urea-formaldehyde, malamine-thiourea-formaldehyde, thiourea-formaldehyde, urea-thiourea-formaldehyde resin or other aminoplast or phenoplast (e. g., a phenol-formaldehyde resin) having inadequate plasticity for a particular application.

All of the linear products prepared in accordance with our invention have a wide field of utility as intermediates in the preparation of other synthetic materials. Thus, they may be condensed with, for instance, aldehydes, including polymeric aldehydes, hydroxyaldehydes and aldehyde-addition products, e. g., formaldehyde, paraformaldehyde, acetaldehyde, propionaldehyde, butyraldehyde, acrolein, methacrolein, crotonaldehyde, octaldehyde, benzaldehyde, furfural, aldol, dimethylol urea, trimethylol or other polymethylol melamine, mixtures thereof, or mixtures of formaldehyde with such reactants, to yield new and useful resinous materials. These reactions may be effected in the presence or absence of other ingredients which are reactive with the polymer or with the aldehyde, e. g., urea, melamine, aniline, phenol, monohydric or polyhydric alcohols (e. g., butyl alcohol, glycerol, etc.), isocyanates, etc. The simple aldehyde-reaction products are useful as modifiers of urea-formaldehyde, melamine-formaldehyde, phenol-formaldehyde and other resinous compositions, for instance, as plasticizers therefor.

In order that those skilled in the art better may understand how the present invention may be carried into effect, the following examples are given by way of illustration and not by way of limitation. All parts and percentages are by weight unless otherwise stated.

*Example 1*

|  | Parts | Approx. Molar Ratio |
| --- | --- | --- |
| Epsilon-caprolactam | 40.0 | 1.0 |
| Water | 30.0 | 4.7 | were mixed and sealed in a glass reactor, which was then heated for about 22 hours at about 180° C. The clear melt solidified upon cooling. The cool reaction mass was pasty but not hard. It was warmed with 300 parts of water for 30 minutes, cooled and filtered. The isolated solid, after drying, amounted to 15.9 parts. It was light-colored, soluble in dilute hydrochloric acid, insoluble in 10% aqueous sodium hydroxide solution and had a melting point of 190°–201° C. A Van Slyke determination indicated 1.53% N as terminal (—NH$_2$) nitrogen which corresponds to an average molecular weight for the water-insoluble polymer of 914.

The filtrate from which the water-insoluble polymer had been removed was evaporated to dryness under reduced pressure, leaving a semi-solid residue. This residue was dissolved in about 200 parts of absolute alcohol, and to the resulting solution about 570 parts of ethyl ether was slowly added. The white solid which precipitated was collected and washed with dry ether. The yield of solid, M. P. 145°–170° C., thereby obtained amounted to 13.2 parts. This alcohol-soluble material was dissolved in 200 parts of water (a small amount remained undissolved), treated with a decolorizing carbon, filtered, and the filtrate then was evaporated to dryness under reduced pressure. About 80 parts of absolute alcohol was added to dissolve the residue, followed by the addition of about 360 parts of dry ether to precipitate the polymer. After collecting and drying, the yield of white, crystalline solid, M. P. 166°–179° C., amounted to 6.6 parts. The alcohol-ether filtrate from which this fraction was precipitated was evaporated to dryness under reduced pressure, leaving about 10 parts of a light-colored solid, M. P. 60°–65° C. A mixed melting point of this solid with epsilon-caprolactam was 60°–65° C.; hence the solid was epsilon-caprolactam.

In a manner similar to that described under Example 1, other polymeric reaction products of epsilon-caprolactam and water were prepared. The proportions and conditions of reaction are given in Table I and the yields and properties of the products, in Table II.

*Table I*

| Example No. | Epsilon-Caprolactam, Parts | Water, Parts | Approx. Moles of Water per Mole of Lactam | Temp. of Reaction, °C. | Time of Reaction, Hours |
| --- | --- | --- | --- | --- | --- |
| 2 | 4 | 1 | 1.1 | 200 | 16 |
| 3 | 4 | 3 | 4.7 | 180 | 6 |
| 4 | 4 | 5 | 7.8 | 170 | 16 |
| 5 | 4 | 5 | 7.8 | 170 | 45 |
| 6 | 4 | 5 | 7.8 | 170 | 100 |
| 7 | 100 | 75 | 4.7 | 200 | 20 |

*Table II*

| Example No. | Approx. Yield of Water-insol. Polymer, Per Cent | Approx. Yield of Water-sol. Polymer, Per Cent | Unreacted Epsilon-Caprolactam, Per Cent | Characteristics of Product |
| --- | --- | --- | --- | --- |
| 2 | 88 | 8 |  | Water-insoluble polymer: M. P. 205°–208° C.; mol. wt. 1820. Water-sol. polymer: M. P. 180°–190° C. |
| 3 | 0 | 4 |  | Water-soluble polymer: M. P. 145°–180° C. |
| 4 | 0 | 5 |  |  |
| 5 | 14 | 37 | 45 |  |
| 6 | 39 | 42 |  | Molecular weight of water-insoluble polymer: 760. |
| 7 | 70 |  |  |  |

In the following series of runs, the reaction between epsilon-caprolactam and water was effected in an autoclave which was fitted with a glass liner. The autoclave was held upright and was not rocked. The initial reaction products were pastes, the consistencies of which varied with the relative proportions of caprolactam and water employed. In some cases filtration was used in separating the solid material from the pasty mass. In others, the reaction mass was diluted with water and then centrifuged. This latter procedure proved to be more satisfactory.

The following procedure is typical of that employed in Examples 8 to 14, inclusive (see Tables III and IV):

The reaction product of Example 13, which was a stiff, white paste, was slurried with 200 cc. of water and warmed on a steam bath for 30 minutes. After cooling, the solid was separated in a small basket centrifuge, and the cake was washed with two 25-cc. portions of water. Because of the fine particle size, approximately 1½ hours was required for centrifuging and washing. After drying under reduced pressure, the resulting water-insoluble fraction of the reaction product weighed 24.2 grams, which corresponded to about 43% of the amount of caprolactam charged to the reactor. The filtrate was clarified by suction filtration, using a small amount of diatomaceous earth as a filter aid, and was then evaporated to dryness on a steam bath. Drying was completed in a vacuum desiccator. The dried solid (31.2 grams) was pulverized and extracted with 150 cc. of boiling benzene to remove unreacted caprolactam. The weight of this water-soluble fraction of the reaction product was 19.2 grams, which corresponded to about 34% of the starting caprolactam (neglecting combined water). Evaporation of the filtrate from the benzene extraction gave 11.2 grams of epsilon-caprolactam, which was identified by melting point (68°–71° C.) and mixed melting point (68°–71° C.). This corresponded to a recovery of about 20% of the original caprolactam.

In working up the reaction products of Examples 8 to 14, inclusive, the amount of water used in the separation and washing of the "insoluble" fraction was kept approximately the same, because the separation from the soluble fraction was not quantitative.

The fractions shown in Table IV as being water-insoluble were also insoluble in 95% ethanol and 0.5 N aqueous hydrochloric acid, but were soluble in glacial acetic acid.

In most of Examples 8–14 molecular weight values for both the water-soluble and water-insoluble fractions were calculated from Van Slyke determinations of nitrogen as terminal ($-NH_2$) nitrogen. Before analysis, 3-gram samples of the water-insoluble fractions were extracted with 30 cc. of hot water, cooled, filtered and washed with 10 cc. of water. The recovery varied from 70 to 80%. The water-soluble fractions were re-extracted with benzene, with almost quantitative recovery, thus establishing that the removal of unreacted caprolactam was substantially complete. The neutralization equivalents of the products of some of the examples were determined by Sörensen titration; the values obtained were in fair agreement with values for molecular weight as calculated from the Van Slyke method.

The proportions and conditions of reaction of this series are given in Table III and the yields and properties of the products, in Table IV.

Table III

| Example No. | Epsilon-Caprolactam, Grams | Water, Grams | Approx. Moles of Water per Mole of Lactam | Temp. of Reaction, °C. | Time of Reaction, Hours |
|---|---|---|---|---|---|
| 8 | 45.2 | 144 | 20 | 180 | 24 |
| 9 | 56.5 | 90 | 10 | 180 | 24 |
| 10 | 56.5 | 90 | 10 | 180 | 24 |
| 11 | 67.8 | 54 | 5 | 180 | 24 |
| 12 | 45.2 | 144 | 20 | 200 | 24 |
| 13 | 56.5 | 90 | 10 | 200 | 24 |
| 14 | 67.8 | 54 | 5 | 200 | 24 |

The relatively wide ranges of melting points in the various polymer fractions which were separated from the crude reaction product are indicative of the presence of mixtures of polymers in both the water-soluble and -insoluble fractions.

It was quite unexpected and in no way could have been predicted that the reaction between epsilon-caprolactam and water in the ratio of 1 mole of the former to at least 1 mole of the latter would yield a preponderance of linear polymeric material and relatively little, if any, of monomeric epsilon-aminocaproic acid. It was also unobvious and in no way could have been predicted that large increases in the molar ratio of water to caprolactam would decrease the amount of starting caprolactam which entered into the reaction. The results of the runs illustrated by the foregoing examples show that the reaction between epsilon-caprolactam and water in the molar ratios aforementioned is an equilibrium reaction and yet, surprisingly, in both of the series of runs at 180° C. and 200° C. (see Tables III and IV), substantial increases in the molar ratio of water to epsilon-caprolactam decreased the percentage of caprolactam which reacted. The reasons for these unusual results are not known, but one possible explanation is that it is because the polymeric acids of higher molecular weight are more resistant to hydrolysis.

Example 15

| | Grams | Approx. Molar Ratio |
|---|---|---|
| Epsilon-caprolactam | 56.5 | 1 |
| Methanol | 80.0 | 5 | were charged to a glass-lined autoclave and heated therein without agitation for 24 hours at 200° C. The reaction mass was then filtered to isolate a finely divided, solid reaction product (A), which was washed with two 25-cc. portions of methanol. The washed product was vacuum-dried, yielding 6.8 grams of a tan, lumpy powder, which was insoluble in ethanol, water and dioxane. Electrometric titration of this powder in 80% ethanol at 40° C. gave a neutralization equivalent of 1050, which value corresponds to a linear polymeric material containing an average of about 9 caprolactam units per molecule.

Evaporation of the combined filtrate and methanol washings (final drying being effected under vacuum) yielded 47.1 grams of a sticky paste

Table IV

| Example No. | Water-Insoluble Reaction Product | | | | | Water-Soluble Reaction Product | | | | | Lactam Recovered, Per Cent |
|---|---|---|---|---|---|---|---|---|---|---|---|
| | Grams | Per Cent* | M. P., °C. | Per Cent N as $-NH_2$ | Mol. Wt. | Grams | Per Cent* | M. P., °C. | Per Cent N as $-NH_2$ | Mol. Wt. | |
| 8 | 0 | 0 | | | | 21.8 | 48 | 152–190 | 5.75 | 243[a] | 47 |
| 9 | 22.9 | 41 | 170–176 | 1.50 | 933 | 18.6 | 33 | 159–190 | 4.66 | 300 | 22 |
| 10 | 24.0 | 42 | 175–186 | | | 18.3 | 32 | 157–185 | | | 19 |
| 11 | 44.9 | 66 | 185–203 | | | 11.8 | 17 | 156–181 | 4.09 | 342[b] | 9 |
| 12 | 11.2 | 25 | 175–188 | 1.10 | 1,270 | 20.0 | 44 | 155–170 | 4.99 | 281 | 27 |
| 13 | 24.2 | 43 | 185–203 | 1.50 | 933 | 19.2 | 34 | 156–175 | 4.76 | 294[c] | 20 |
| 14 | 42.3 | 62 | 198–203 | 1.00 | 1,400 | 10.9 | 16 | 157–185 | 3.39 | 413 | 13 |
| | | | | 0.96 | 1,460 | | | | | | |

*These figures are based on the amount of caprolactam originally present and neglect the weight of water combined in the product. Since the products are polymeric, this makes little difference in the values for the percentages of the various product fractions.
[a]. Neutralization equivalent from Sörensen titration 223.
[b]. Neutralization equivalent from Sörensen titration 313.
[c]. Neutralization equivalent from Sörensen titration 313.

which was extracted with 75 cc. of benzene, leaving a residue of a light-colored solid (B). After washing this solid with benzene and thoroughly drying the washed material, 11 grams of a waxy solid (soluble in ethanol and water) was obtained. Titration of a sample of this product to a methyl orange end point gave a neutralization equivalent of 590, which value corresponds to a linear polymeric material containing an average of about 5 caprolactam units per molecule.

The benzene filtrate from (B) was evaporated on the steam bath, leaving a clear liquid which partially solidified upon cooling. This residue (C) did not solidify completely after prolonged drying under vacuum, but remained as crystals suspended in an oil. Titration of a sample of (C) gave a neutralization equivalent, after correcting for the amount of non-basic material present in (C), of 370, which value corresponds to a linear polymeric material containing an average of about 3 caprolactam units per molecule.

The non-basic material present in (C) was determined as follows: To a solution of 6.39 grams of (C) in 12 cc. of water and 5 drops of methyl orange indicator was added an excess of dilute hydrochloric acid. The acidified solution was extracted with five 10-cc. portions of chloroform. The combined chloroform extracts were dried over anhydrous sodium sulfate, and the chloroform was evaporated on a steam bath. After final drying under vacuum there remained 4.45 grams of a tan solid, M. P. 53°–67° C. This would indicate that product (C) contained approximately 70% of non-basic material. Extraction of the tan solid with two 25-cc. portions of boiling hexane, decanting the extract from the undissolved material, and cooling to effect crystallization, gave 2.21 grams of epsilon-caprolactam, which was identified by melting point (65°–70° C.) and mixed melting point (67°–70° C.).

From the foregoing fractional separation data, the distribution of products in the crude reaction product may be summarized as follows: approximately 12% of polymeric material containing an average of about 9 caprolactam units per molecule; approximately 20% of polymeric material containing an average of about 5 caprolactam units per molecule; approximately 20% of polymeric material containing an average of about 3 caprolactam units per molecule; and the remainder, unreacted caprolactam and other non-basic material.

*Example 16*

Same as Example 15 with the exception that 115 grams of ethanol is used in place of 80 grams of methanol. Similar polymeric products are obtained.

*Example 17*

Same as Example 15 with the exception that 190 grams of ethylene glycol monomethyl ether ($CH_3OCH_2CH_2OH$) is used in place of 80 grams of methanol, and the reaction temperature is 225° C. instead of 200° C. Similar polymeric products are obtained.

*Example 18*

| | Parts | Approx. Molar Ratio |
|---|---|---|
| Epsilon-caprolactam | 33.9 | 1 |
| Diethylene glycol monobutyl ether | 48.6 | 1 | were heated together, under an atmosphere of carbon dioxide, at a temperature of 222°–226° C. for 6 hours. The pressure in the system was then gradually reduced and heating at the above temperature was continued at a pressure of 1 mm. until all unreacted epsilon-caprolactam and diethylene glycol monobutyl ether had been distilled from the reaction mass. There remained 10 parts of a reaction product which was a viscous liquid while hot and which solidified to a yellow, waxy solid upon cooling to room temperature. The linear polymeric material was sparingly soluble in hot, 95% ethyl alcohol. Its approximate molecular weight, as calculated from the results of an electrometric titration of a sample, was 2430.

The material differences between the products prepared in accordance with our invention and the products obtained by the polymerization of epsilon-caprolactam in the presence or absence of a polymerization catalyst are apparent from a comparison of the properties of the linear polymeric materials of the above examples with those of the following examples.

*Example 19*

Epsilon-caprolactam (8 parts) was polymerized in a sealed glass tube, which had been evacuated prior to sealing to remove air, by heating for 93 hours at about 225° C. At the end of this period and at this temperature, the hot polymer was a transparent, viscous liquid. Upon cooling to room temperature, a hard, tough, opaque rod of polymer was produced. The product was soluble in m-cresol but completely insoluble in water, ethanol and diethyl ether.

A portion of the rod of polymer was cut into thin slices which were allowed to stand in m-cresol until solution was complete. The viscosity of the dilute solution (0.5 g. polymer per 100 cc. of solution) was determined at 25° C. The intrinsic viscosity of the polymer was 1.06, the value being calculated from the following equation:

$$\text{Intrinsic viscosity} = \frac{\log_e \eta_r}{c}$$

wherein $\eta_r$ = viscosity of dilute solution of polymer in m-cresol divided by the viscosity of m-cresol in the same units at the same temperature; and $c$ = concentration of polymer in grams per 100 cc. of solution.

*Example 20*

Essentially the same procedure was followed as described under Example 19 with the exception that a small amount of a polymerization catalyst, specifically octadecylamine hydrochloride, was incorporated into the epsilon-caprolactam. More particularly a mixture of 5 parts of epsilon-caprolactam and 0.068 part of octadecylamine hydrochloride, that is, in the ratio of 0.005 mole of the latter per mole of the former, were mixed together, sealed in a glass tube and heated for 72 hours at 222°–228° C. The resulting polymer, when cold, was a hard, tough, opaque rod. The intrinsic viscosity of this polymer was 0.93. It was soluble in m-cresol but insoluble in the same solvents mentioned under Example 18 with regard to the product of that example.

*Example 21*

Same as Example 19 with the exception that a small amount of water was used as a polymerization catalyst, more particularly 0.011 part of water to 4 parts of epsilon-caprolcatam, that is, in the ratio of 0.017 mole of water per mole of epsilon-caprolactam. A hard, tough, opaque rod of polymer having an intrinsic viscosity of 1.36 was obtained.

When three times as much water by weight was used for the same amount of epsilon-caprolactam, the resulting polymer had an intrinsic viscosity of 1.00.

The products of this example were soluble in m-cresol but insoluble in water, ethanol and diethyl ether.

It will be understood, of course, by those skilled in the art that instead of methanol or ethanol other monohydric alcohols of the kind embraced by Formula I can be used in similar methods; or, instead of ethylene glycol monomethyl ether, any other alcohol-ether of the kind embraced by Formula II can be similarly employed. Illustrative examples of such alcohols and alcohol-ethers are listed below:

Propyl alcohol
Isopropyl alcohol
n-Butyl alcohol
Isobutyl alcohol
sec.-Butyl alcohol
tert.-Butyl alcohol
n-Amyl alcohol
tert.-Amyl alcohol
Hexyl alcohol
Decyl alcohol
Octadecyl alcohol
Allyl alcohol
Methallyl alcohol
Crotyl alcohol
Cyclohexyl alcohol
Benzyl alcohol
3-buten-1-ol
3-buten-2-ol
Phenylethyl alcohol
Ethylene glycol monoethyl ether
Ethylene glycol monobutyl ether
Ethylene glycol ethylbutyl ether
Ethylene glycol monophenyl ether
Ethylene glycol monotolyl ether
Ethylene glycol monobenzyl ether
Ethylene glycol monoallyl ether
Ethylene glycol monocyclohexyl ether
Propylene glycol monomethyl ether
Propylene glycol monoethyl ether
Propylene glycol monobutyl ether
Propylene glycol monophenyl ether
Diethylene glycol monomethyl ether
Diethylene glycol monoethyl ether
Diethylene glycol monobutyl ether
Pentylene glycol monomethyl ether
Isopentylene glycol monoethyl ether
Decylene glycol monophenyl ether
Dibutylene glycol monopropyl ether
Phenylethylene glycol monobutyl ether Other examples will be apparent to those skilled in the art from Formulas I and II and from the illustrative examples hereinbefore given of radicals which R, R' and R" may represent, and from the values of $n$, which may be, for instance, any integer from 1 to 100, inclusive, or any higher integer.

We claim:

1. The method which comprises heating a mixture of epsilon-caprolactam and methyl alcohol in the approximate molar ratio of 1 mole of the former to 5 moles of the latter at 200° C. for 24 hours, and isolating from the resulting reaction mass approximately 12% by weight of polymeric material containing an average of about 9 caprolactam units per molecule, approximately 20% by weight of polymeric material containing an average of about 5 caprolactam units per molecule and about 20% of polymeric material containing an average of about 3 caprolactam units per molecule.

2. The method of preparing and isolating different fractions of a reaction product of epsilon-caprolactam and methyl alcohol, said method comprising heating a mixture of epsilon-caprolactam and methyl alcohol in the approximate molar ratio of 1 mole of the former to 5 moles of the latter, without agitation, for 24 hours at 200° C.; filtering the resulting reaction mass to isolate a finely divided, solid reaction product; washing the said reaction product with methyl alcohol; drying the washed material thereby to obtain approximately 12% by weight of polymeric material containing an average of about 9 caprolactam units per molecule; evaporating the combined filtrate and methyl alcohol washings; drying the resulting residue; extracting the dried residue with benzene thereby to obtain a residue of a light-colored solid; washing the said solid with benzene and thoroughly drying the washed material thereby to obtain approximately 20% by weight of polymeric material containing an average of about 5 caprolactam units per molecule; and evaporating the benzene extract to obtain a clear liquid which partially solidifies upon cooling and which contains about 20% of polymeric material containing an average of about 3 caprolactam units per molecule.

EDWARD L. KROPA.
JOHN J. PADBURY.

REFERENCES CITED

The following references are of record in the file of this patent:

UNITED STATES PATENTS

| Number | Name | Date |
| --- | --- | --- |
| 2,163,636 | Spanagel | June 27, 1939 |
| 2,241,322 | Hanford | May 6, 1941 |

OTHER REFERENCES

Ser. No. 393,282, Hopff et al. (A. P. C.), pub. Apr. 20, 1943.